US010309265B2

United States Patent
Okada et al.

(10) Patent No.: US 10,309,265 B2
(45) Date of Patent: Jun. 4, 2019

(54) DOHC-TYPE INTERNAL COMBUSTION ENGINE

(71) Applicant: HONDA MOTOR CO., LTD., Minato-ku, Tokyo (JP)

(72) Inventors: Nozomi Okada, Wako (JP); Yosuke Hoi, Wako (JP); Isao Azumagakito, Wako (JP); Tsugumi Shinke, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/879,858

(22) Filed: Jan. 25, 2018

(65) Prior Publication Data
US 2018/0274394 A1    Sep. 27, 2018

(30) Foreign Application Priority Data
Mar. 21, 2017   (JP) .................................. 2017-054153

(51) Int. Cl.
*F01L 1/18* (2006.01)
*F01L 1/02* (2006.01)
(Continued)

(52) U.S. Cl.
CPC ............... *F01L 1/185* (2013.01); *F01L 1/022* (2013.01); *F01L 1/053* (2013.01);
(Continued)

(58) Field of Classification Search
CPC . F01L 1/185; F01L 1/022; F01L 1/053; F01L 2001/0537; F01L 2105/00; Y02T 10/18; F02D 2041/001
See application file for complete search history.

(56) References Cited

U.S. PATENT DOCUMENTS 4,617,881 A * 10/1986 Aoi ..................... F01L 1/185
123/90.22
4,621,597 A * 11/1986 Kawada .................. F01L 1/04
123/193.5
(Continued)

FOREIGN PATENT DOCUMENTS

DE    40 18 586 A1   12/1991
EP    0 258 061 A1    3/1988
(Continued)

OTHER PUBLICATIONS

Extended European search report dated Jul. 23, 2018 issued in the corresponding EP patent application 18153791.1.

*Primary Examiner* — Mark A Laurenzi
*Assistant Examiner* — Wesley G Harris
(74) *Attorney, Agent, or Firm* — Carrier Blackman & Associates, P.C.; William D. Blackman; Joseph P. Carrier

(57) ABSTRACT

In a DOHC-type internal combustion engine in which a pair of intake valves and a pair of exhaust valves are disposed around a plug hole, and two pairs of rocker arms are respectively interposed between intake-side and exhaust-side camshafts and the intake valves and the exhaust valves, first and second support portions of one pair of the rocker arms are disposed between the intake valves and the exhaust valves in a direction orthogonal to axes of the intake-side and exhaust-side camshafts and around the plug hole, and the third and fourth support portions of an other pair of the rocker arms are disposed outside a region between the intake valves and the exhaust valves in the direction orthogonal to the axes of the intake-side and exhaust-side camshafts.

6 Claims, 8 Drawing Sheets

US 10,309,265 B2
Page 2

(51) Int. Cl.
*F01L 1/053* (2006.01)
*F02D 41/00* (2006.01)

(52) U.S. Cl.
CPC ... *F01L 2001/0537* (2013.01); *F01L 2105/00* (2013.01); *F02D 2041/001* (2013.01); *Y02T 10/18* (2013.01)

(56) References Cited

U.S. PATENT DOCUMENTS

| | | | |
|---|---|---|---|
| 4,844,022 A | 7/1989 | Konno | |
| 5,031,586 A * | 7/1991 | Masuda | F01L 1/2405 123/196 M |
| 2002/0134341 A1 * | 9/2002 | Uchida | F02F 1/242 123/193.5 |
| 2006/0266315 A1 * | 11/2006 | Hamada | F01L 1/053 123/90.16 |
| 2006/0278186 A1 * | 12/2006 | Murata | F01L 13/0063 123/90.16 |
| 2007/0144477 A1 * | 6/2007 | Matsuda | F01L 1/024 123/90.27 |
| 2010/0050968 A1 * | 3/2010 | Emmersberger | F01L 1/053 123/90.23 |
| 2015/0053174 A1 * | 2/2015 | Nishimoto | F02D 13/0207 123/346 |
| 2015/0377151 A1 * | 12/2015 | Hashimoto | F01M 1/16 123/90.15 |
| 2016/0215705 A1 * | 7/2016 | Haizaki | F02D 13/0215 |
| 2016/0265396 A1 | 9/2016 | Tomas et al. | |
| 2016/0341079 A1 | 11/2016 | Takahata et al. | |
| 2017/0114729 A1 * | 4/2017 | Ashikaga | F02D 41/0087 |

FOREIGN PATENT DOCUMENTS

| | | |
|---|---|---|
| EP | 2 615 267 A2 | 7/2013 |
| EP | 3 301 283 A1 | 4/2018 |
| JP | 2015-094238 A | 5/2015 |

\* cited by examiner

DOHC-TYPE INTERNAL COMBUSTION ENGINE

BACKGROUND OF THE INVENTION

Field of the Invention

The present invention relates to a DOHC-type internal combustion engine, in which an intake-side camshaft and an exhaust-side camshaft are disposed in parallel to each other with a plug hole interposed therebetween, an ignition plug being to be inserted into the plug hole, a pair of intake valves and a pair of exhaust valves are disposed around the plug hole, the intake valves being arrayed in a direction along an axis of the intake-side camshaft, the exhaust valves being arrayed in a direction along an axis of the exhaust-side camshaft, two pairs of rocker arms are respectively interposed between the intake-side and exhaust-side camshafts and the intake valves and the exhaust valves, the two pairs of rocker arms respectively corresponding to the intake valves and the exhaust valves while respectively including support portions and valve connection portions, the support portions being rockably supported by a cylinder head, the valve connection portions being operatively connected respectively with the intake valves and the exhaust valves.

Description of the Related Art

A DOHC-type internal combustion engine is known in Japanese Patent Application Laid-Open No. 2015-94238. In the DOHC-type internal combustion engine, an intake-side camshaft and an exhaust-side camshaft are disposed in parallel to each other with plug holes interposed therebetween, and support portions of rocker arms having a same shape are disposed around the plug holes.

In the DOHC-type internal combustion engine disclosed in Japanese Patent Application Laid-Open No. 2015-94238 described above, although four rocker arms can be of a same shape to enable co-use, the rocker arms are obliged to be disposed apart from each other in the direction along the axes of the intake-side camshaft and the exhaust-side camshaft, it is required to set a space for disposing the intake valve and the exhaust valve comparative large, and further downsizing of the cylinder head has become a problem.

SUMMARY OF THE INVENTION

The present invention has been achieved in view of the above-mentioned circumstances, and it is an object thereof to provide a DOHC-type internal combustion engine that makes a disposal space of an intake valve and an exhaust valve comparatively small, and enables downsizing of a cylinder head.

In order to achieve the object, according to a first feature of the present invention, there is provided a DOHC-type internal combustion engine, in which an intake-side camshaft and an exhaust-side camshaft are disposed in parallel to each other with a plug hole interposed therebetween, an ignition plug being to be inserted into the plug hole, a pair of intake valves and a pair of exhaust valves are disposed around the plug hole, the intake valves being arrayed in a direction along an axis of the intake-side camshaft, the exhaust valves being arrayed in a direction along an axis of the exhaust-side camshaft, two pairs of rocker arms are respectively interposed between the intake-side and exhaust-side camshafts and the intake valves and the exhaust valves, the two pairs of rocker arms respectively corresponding to the intake valves and the exhaust valves while respectively including support portions and valve connection portions, the support portions being rockably supported by a cylinder head, the valve connection portions being operatively connected respectively with the intake valves and the exhaust valves, wherein the first and second support portions of one pair of the rocker arms out of the support portions are disposed between the intake valves and the exhaust valves in a direction orthogonal to the axes of the intake-side and exhaust-side camshafts and around the plug hole, and the third and fourth support portions of an other pair of the rocker arms out of the support portions are disposed outside a region between the intake valves and the exhaust valves in the direction orthogonal to the axes of the intake-side and exhaust-side camshafts.

With the first feature of the present invention, the first and second support portions are disposed around the plug hole between the intake valve and the exhaust valve in the direction orthogonal to the axes of the intake-side and exhaust-side camshafts, the first and second support portions being included in one pair of the two pairs of rocker arms, and the third and fourth support portions are disposed outside a region between the intake valve and the exhaust valve in the direction orthogonal to the axes of the intake-side and exhaust-side camshafts, the third and fourth support portions being included in the other pair of the rocker arms. Therefore, the intake valves can be disposed closer to each other and also the exhaust valves can be disposed closer to each other, in the direction along the axes of the intake-side and exhaust-side camshafts, while securing the length of each rocker arm to reduce the rocking angle while avoiding interference with the plug hole, and downsizing of the cylinder head can be achieved.

According to a second feature of the present invention, in addition to the first feature, a distance between the first and second valve connection portions of the one pair of rocker arms is set shorter than a distance between the first and second support portions, and a distance between the third and fourth valve connection portions of the other pair of the rocker arms is set longer than a distance between the third and fourth support portions.

With the second feature of the present invention, the distance between the valve connection portions of the one pair of the rocker arms whose first and second support portions are disposed around the plug hole is shorter than the distance between the first and second support portions, and the distance between the valve connection portions of the other pair of the rocker arms is longer than the distance between the third and fourth support portions. Therefore, the intake valves can be disposed closer to each other and also the exhaust valves can be disposed closer to each other, in the direction along the axes of the intake-side and exhaust-side camshafts, and the distance between the third and fourth support portions disposed outside a region between the intake valves and the exhaust valves in the direction orthogonal to the axes of the intake-side and exhaust-side camshafts can be made comparatively short which can contribute to further downsizing of the cylinder head.

According to a third feature of the present invention, in addition to the second feature, the rocker arm, on one side along the axes of the intake-side and exhaust-side camshafts out of the one pair of the rocker arms, and the rocker arm, on the other side along the axes of the intake-side and exhaust-side camshafts out of the other pair of the rocker arms, have a same shape and are commonalized, and the rocker arm, on the other side along the axes of the intake-side and exhaust-side camshafts out of the one pair of the rocker arms, and the rocker arm, on one side along the axes of the intake-side and exhaust-side camshafts out of the other pair of the rocker arms, have a same shape and are commonalized.

With the third feature of the present invention, the pair of rocker arms on the intake valve side and the pair of rocker arms on the exhaust valve side are commonalized between the intake side and the exhaust side in terms of the bending direction of these rocker arms. Therefore, the shape of the rocker arms can be consolidated into two kinds, the number of components can be reduced, and assembling efficiency can be improved.

According to a fourth feature of the present invention, in addition to the third feature, out of the two pairs of the rocker arms each pair having two kinds of shapes, an inside diameter of a support hole, which is formed in the first and fourth support portions of one kind of the rocker arms, and an inside diameter of a support hole, which is formed in the second and third support portions of an other kind of the rocker arms, are set different from each other.

With the fourth feature of the present invention, the inside diameter of the support hole of the first and fourth support portions of one kind of the rocker arms and the inside diameter of the support hole of the second and third support portions of the other kind of the rocker arms are different from each other. Therefore, while achieving downsizing of the cylinder head, assembling position of each rocker arm can be made clear, misassembling can be prevented, and assembling efficiency can be improved.

According to a fifth feature of the present invention, in addition to the fourth feature, a tubular portion is arranged integrally in the cylinder head, the tubular portion forming at least a part of the plug hole, first and second rocker shafts are disposed on opposite sides of the plug hole in a direction along the axes of the intake-side and exhaust-side camshafts, the first and second rocker shafts supporting the first and second support portions individually, a pair of support recesses are formed in the tubular portion, end portions on the plug hole side of the first and second rocker shafts being fitted to the pair of support recesses respectively, and axial movement of at least one of the first and second rocker shafts is prevented by an anti-come-off plug and an inner end closing portion of at least one of the pair of support recesses, the anti-come-off plug being attached to the cylinder head so as to abut, from a side opposite to the plug hole, against at least the one of the first and second rocker shafts.

With the fifth feature of the present invention, the pair of support recesses are formed in the tubular portion that forms at least a part of the plug hole and is arranged integrally in the cylinder head, the end portions on the plug hole side of the first and second rocker shafts being respectively fitted to the pair of support recesses, the first and second rocker shafts individually supporting the first and second support portions, and axial movement of at least one of the first and second rocker shafts is prevented by the inner end closing portion of at least one support recess and the anti-come-off plug that is attached to the cylinder head so as to abut against at least the one rocker shaft. Therefore, axial movement of at least the one rocker shaft can be prevented utilizing the tubular portion, and assembling efficiency of at least the one rocker shaft and productivity of the internal combustion engine can be thereby improved.

According to a sixth feature of the present invention, in addition to the fifth feature, a part of a cam chain chamber is formed in the cylinder head, the cam chain chamber being disposed so that an other of the first and second rocker shafts is sandwiched between the cam chain chamber and the plug hole, and an anti-come-off pin is attached to the cylinder head, the anti-come-off pin engaging with an annular locking groove that is formed on an outer surface of an intermediate portion of the other rocker shaft.

With the sixth feature of the present invention, axial movement of the other of the first and second rocker shafts is prevented by engagement of the anti-come-off pin with the annular locking groove that is formed on the outer surface of the intermediate portion of the other rocker shaft. Therefore, it is not required to reserve a special space for preventing coming-off of the other rocker shaft, between the plug hole and the cam chain chamber, and downsizing of the cylinder head can be achieved.

According to a seventh feature of the present invention, in addition to the fourth feature, a single third rocker shaft is formed to have a step so that a portion of the third rocker shaft which is inserted to the third support portion and a portion of the third rocker shaft which is inserted to the fourth support portion are made different in an outside diameter, the third rocker shaft being common to the third and fourth support portions.

With the seventh feature of the present invention, the single third rocker shaft is formed to have a step so as to cope with an event that the inside diameters of the support holes formed in the third and fourth support portions are different from each other. Thereby, a space required for supporting the third and fourth support portions is reduced, the coming-off structure for the third rocker shaft is simplified, and assembling efficiency is improved which can contribute to improvement of the productivity.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention will be explained referring to FIG. 1 to FIG. 8 attached. Also, in the explanation described below, up, down, front, rear, left, and right are directions when viewed by an occupant riding a two-wheeled motor vehicle.

Figure 1:
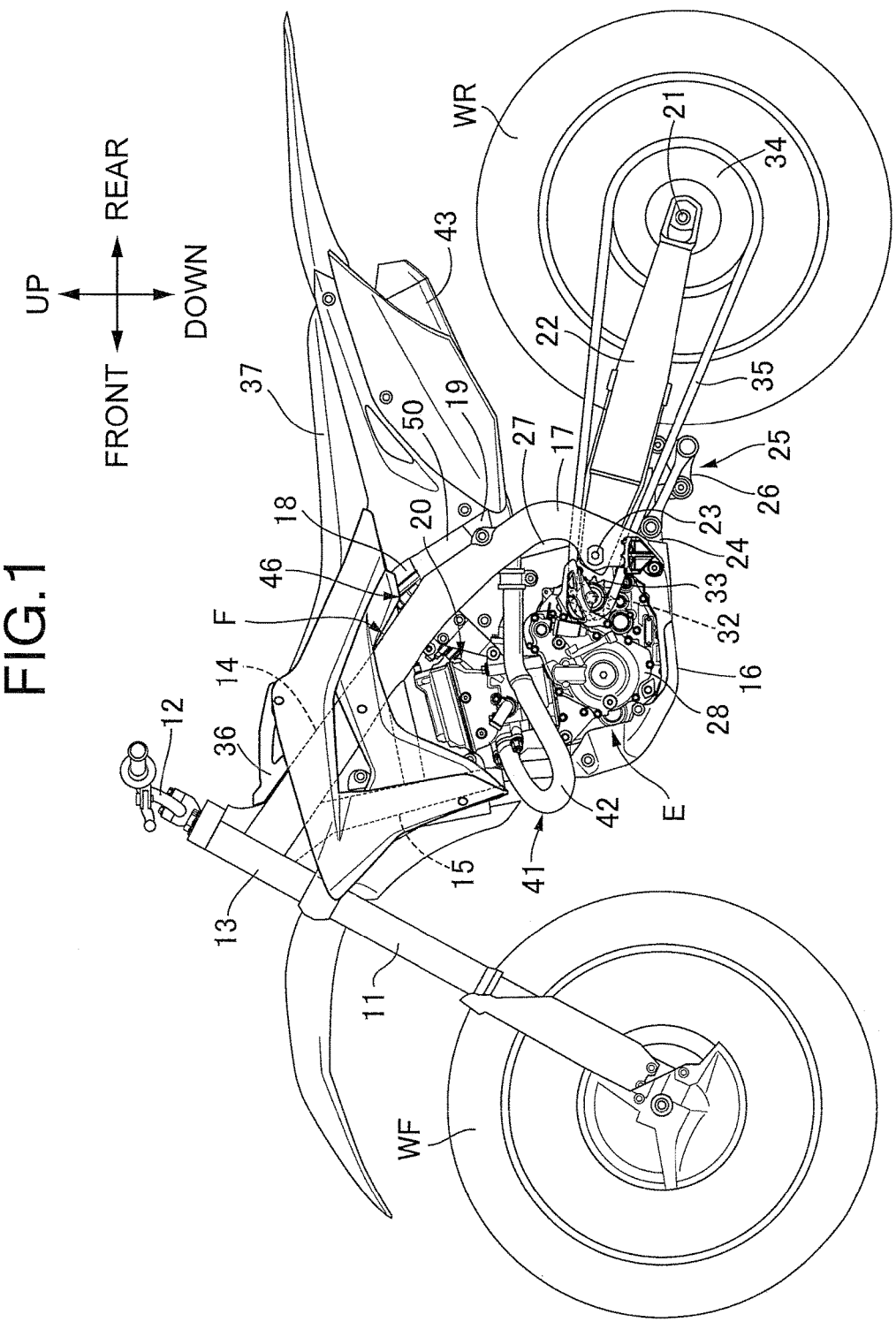
FIG. 1 is a left side view of a two-wheeled motor vehicle.

First, in FIG. 1, a body frame F of a two-wheeled motor vehicle that is for rough terrain travel includes a head pipe 13, a pair of left and right main frames 14, a down frame 15, a pair of left and right lower frames 16, a pair of left and right pivot frames 17, a pair of left and right seat rails 18, and a pair of left and right rear frames 19, the head pipe 13 steerably supporting a front fork 11 and a steering handlebar 12, the front fork 11 pivotally supporting a front wheel WF, the steering handlebar 12 having a bar shape, the pair of left and right main frames 14 extending downward to the rear from the head pipe 13, the down frame 15 extending downward to the rear at a steeper angle than the main frames 14 from the head pipe 13, the pair of left and right lower frames 16 being connected to the lower end portion of the down frame 15 and extending rearward, the upper end portions of the pair of left and right pivot frames 17 being connected integrally to the rear end portions of the main frames 14 and extending downward, the rear end portions of the both lower frames 16 being connected to the lower end portions of the pair of left and right pivot frames 17, the pair of left and right seat rails 18 being connected to the rear end portions of the main frames 14 and extending rearward, the pair of left and right rear frames 19 extending upward to the rear with the front end portions of the rear frames 19 being connected to the intermediate portions in the up-down direction of the both pivot frames 17 and with the rear end portions of the rear frames 19 being connected to the pivot frames 17.

On the body frame F, an engine body 20 of a single cylinder DOHC-type internal combustion engine E is mounted so as to be disposed below the main frames 14 as seen in a side view. An axle 21 of a rear wheel WR is pivotally supported by the rear end portion of a swing arm 22, and the front end portion of this swing arm 22 is supported by the lower portions of the pivot frames 17 in the body frame F through a spindle 23 in an up-down swingable manner.

A link mechanism 25 is arranged between a bracket 24 and the swing arm 22, the bracket 24 being arranged in the lower portion of the pivot frames 17 in the body frame F, and a rear cushion unit 27 that extends in the up-down direction is arranged between a link member 26 and the upper portion of the pivot frames 17, the link member 26 configuring a part of the link mechanism 25.

A transmission not illustrated is stored within a crankcase 28 that configures a part of the engine body 20, an output shaft 32 of the transmission protrudes sideways to the left from the crankcase 28, and a drive chain 35 of an endless shape is wound around a driving sprocket 33 and a follower sprocket 34, the driving sprocket 33 being arranged on the output shaft 32, the follower sprocket 34 being arranged on the axle 21 of the rear wheel WR.

Also, a fuel tank 36 is arranged above the engine body 20 and on the both main frames 14, and a riding seat 37 is disposed behind the fuel tank 36 so as to be supported by the seat rails 18.

Figure 2:
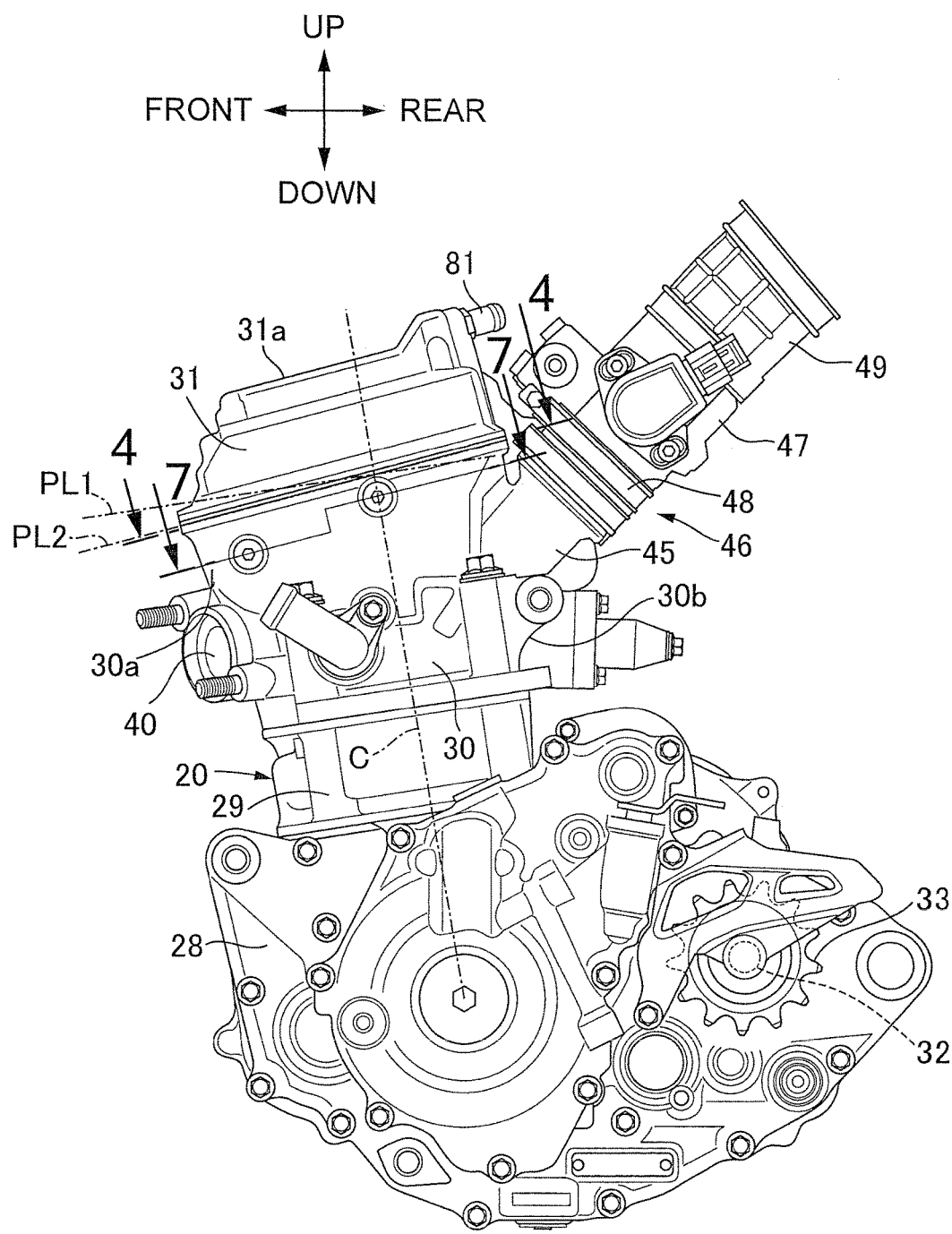
FIG. 2 is a left side view of an internal combustion engine.
Figure 3:
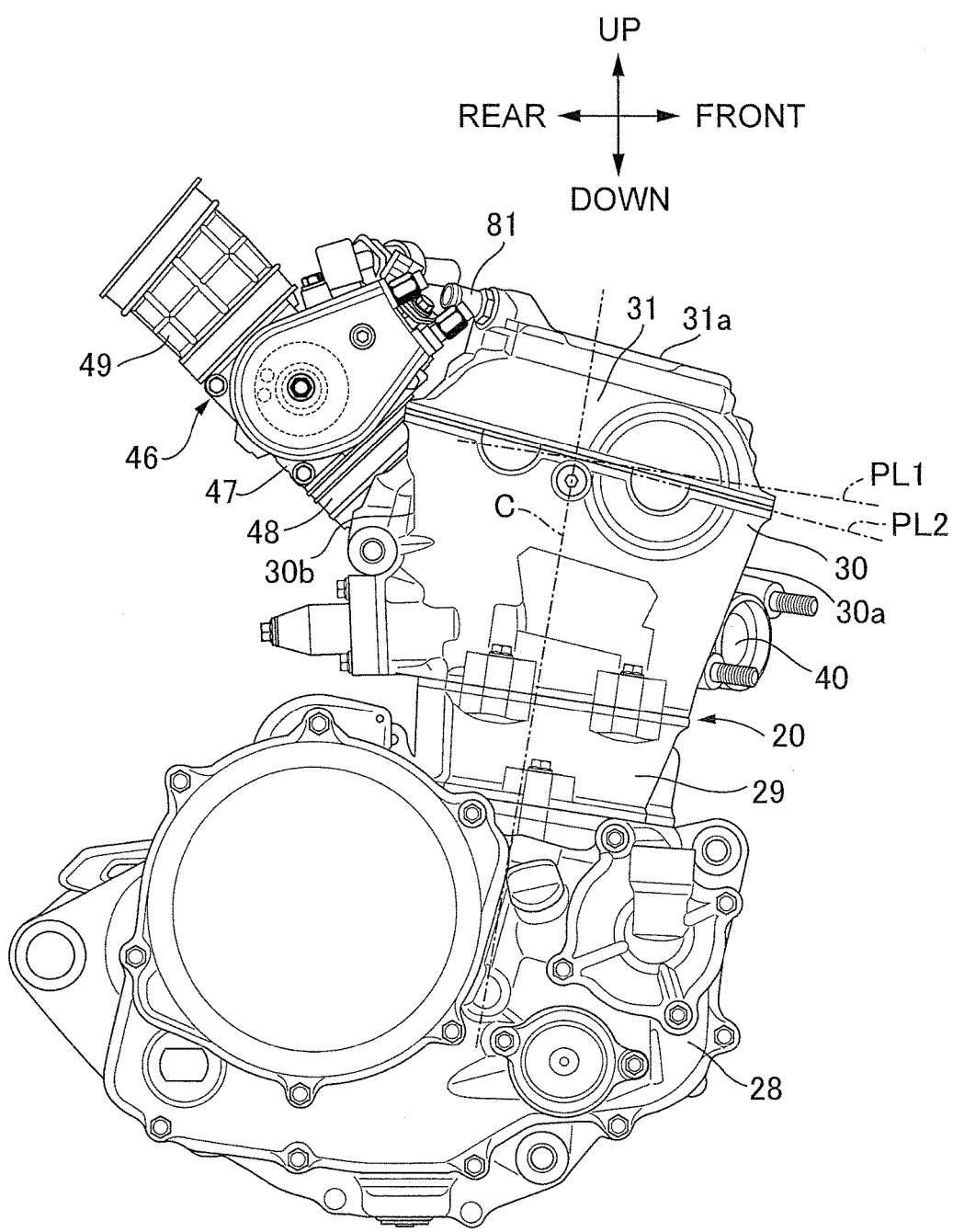
FIG. 3 is a right side view of the internal combustion engine.

With reference also to FIG. 2 and FIG. 3, the engine body 20 includes the crankcase 28, a cylinder body 29, a cylinder head 30, and a head cover 31, the cylinder body 29 being joined to the front side upper portion of the crankcase 28 and extending upward, the cylinder head 30 being joined to the upper portion of the cylinder body 29, the head cover 31 being joined to the upper portion of the cylinder head 30, and the engine body 20 is mounted on the body frame F with such attitude that a cylinder axis C is slightly tilted forward. Also, the cylinder head 30 and the head cover 31 are joined to each other on a second imaginary plane PL2 that crosses the cylinder axis C with the forward tilt angle of the second imaginary plane PL2 slightly larger than that of a first imaginary plane PL1 that tilts so as to be positioned at an upper position as it goes to the rear along the vehicle longitudinal direction and is orthogonal to the cylinder axis C.

Figure 4:
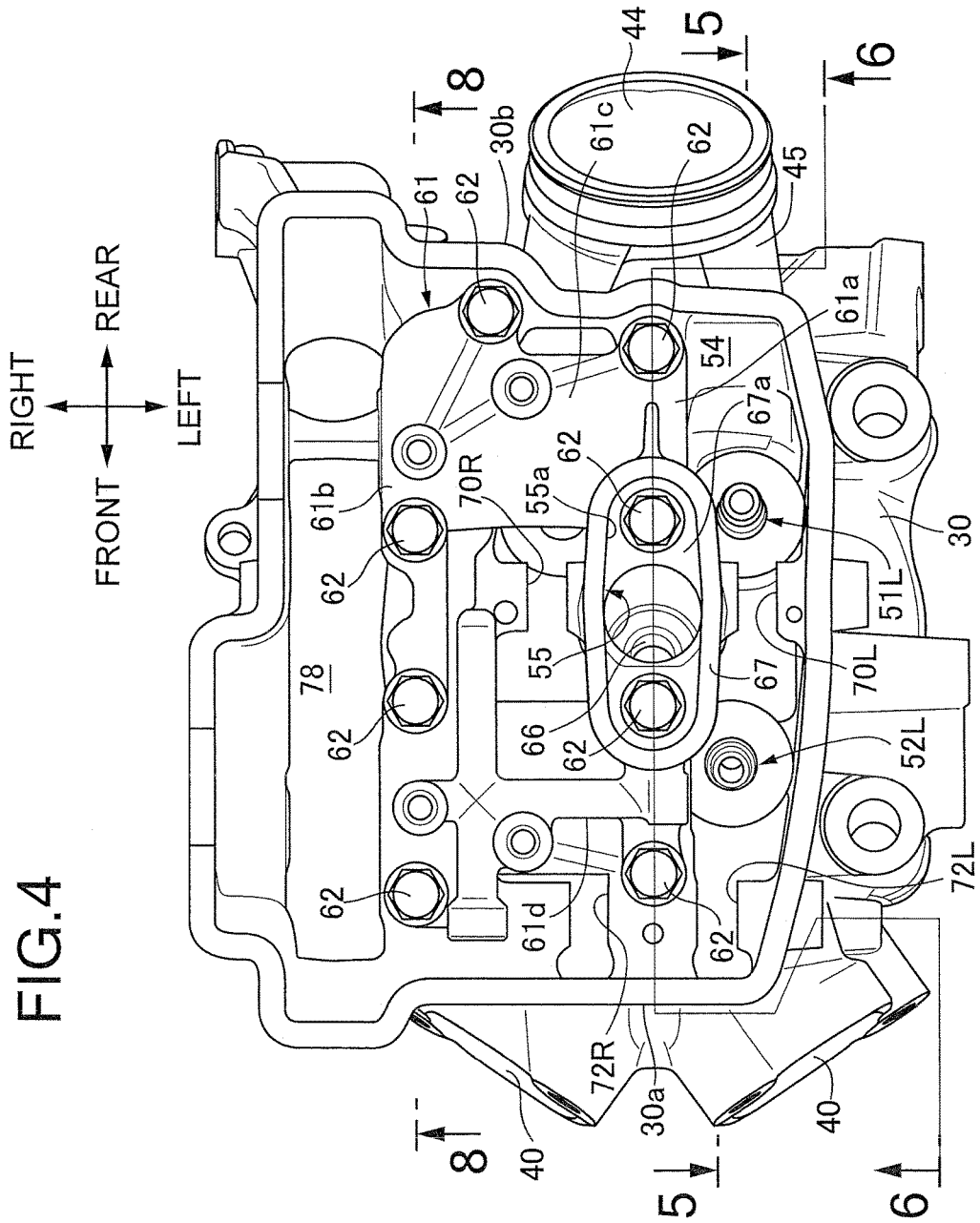
FIG. 4 is a view of a cylinder head viewed from a direction of the arrowed line 4-4 in FIG. 2.

With reference also to FIG. 4, a pair of left and right exhaust ports 40 are arranged in a front wall 30a of the cylinder head 30, and an exhaust device 41 of the internal combustion engine E includes a pair of exhaust pipes 42 and a pair of left and right mufflers 43 as shown clearly in FIG. 1, the pair of exhaust pipes 42 respectively coming around the left and right of the engine body 20 with the upstream side end portions of the exhaust pipes 42 being connected to the exhaust ports 40, the pair of left and right mufflers 43 being connected respectively to the downstream side ends of the exhaust pipes 42 and being disposed above the rear wheel WR.

From a rear wall 30b of the cylinder head 30, an intake connection pipe portion 45 that configures a single intake port 44 is protruded obliquely upward to the rear, and an intake device 46 of the internal combustion engine E includes a throttle body 47, an insulator 48, a connecting tube 49, and an air cleaner 50, the throttle body 47 adjusting the air quantity that is supplied to the intake port 44, the insulator 48 connecting the intake connection pipe portion 45 and the throttle body 47 to each other, the downstream side end of the connecting tube 49 being connected to the upstream side end of the throttle body 47, the air cleaner 50 being disposed below the riding seat 37 so that the upstream side end of the connecting tube 49 is connected to the air cleaner 50 (refer to FIG. 1).

Figure 5:
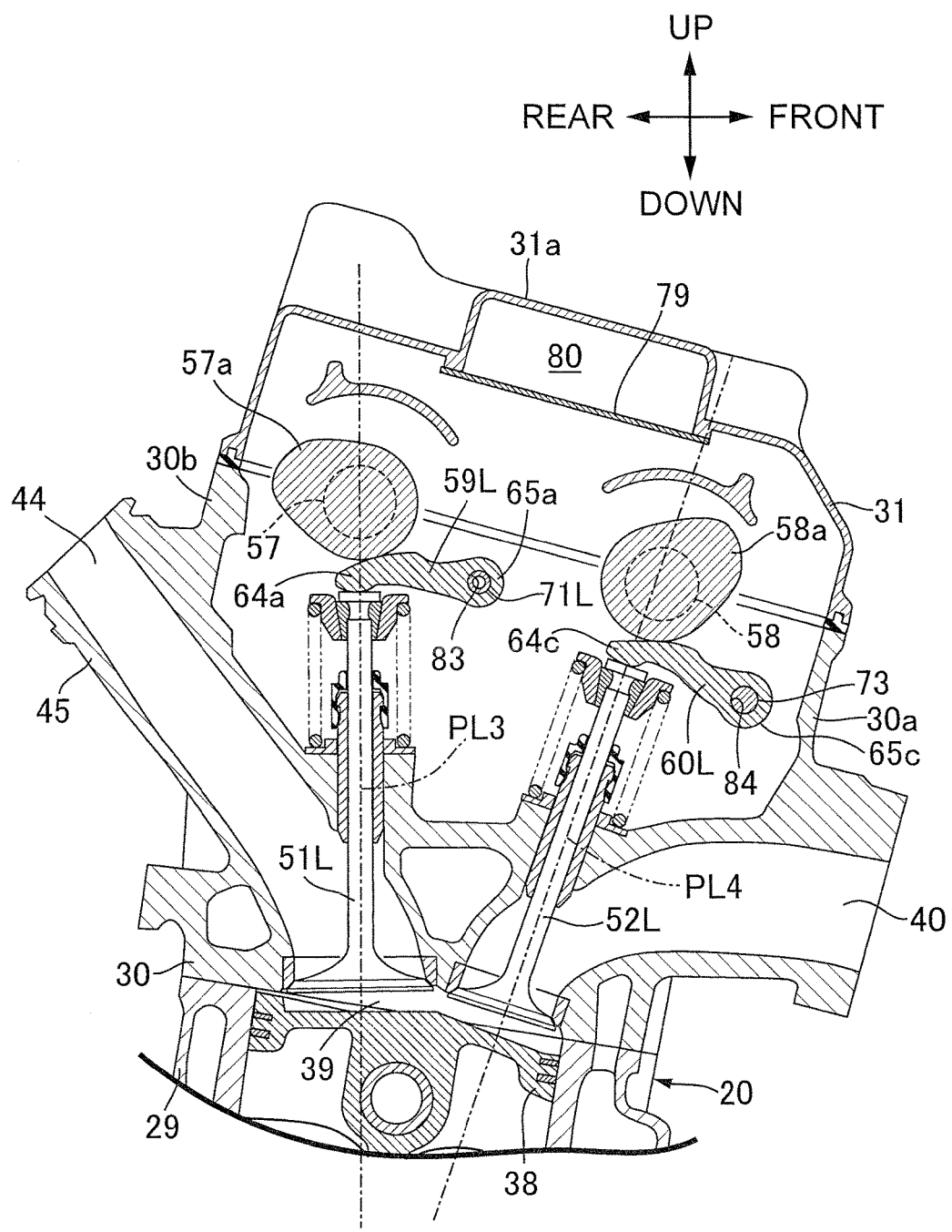
FIG. 5 is a sectional view taken along the line 5-5 of FIG. 4.
Figure 6:
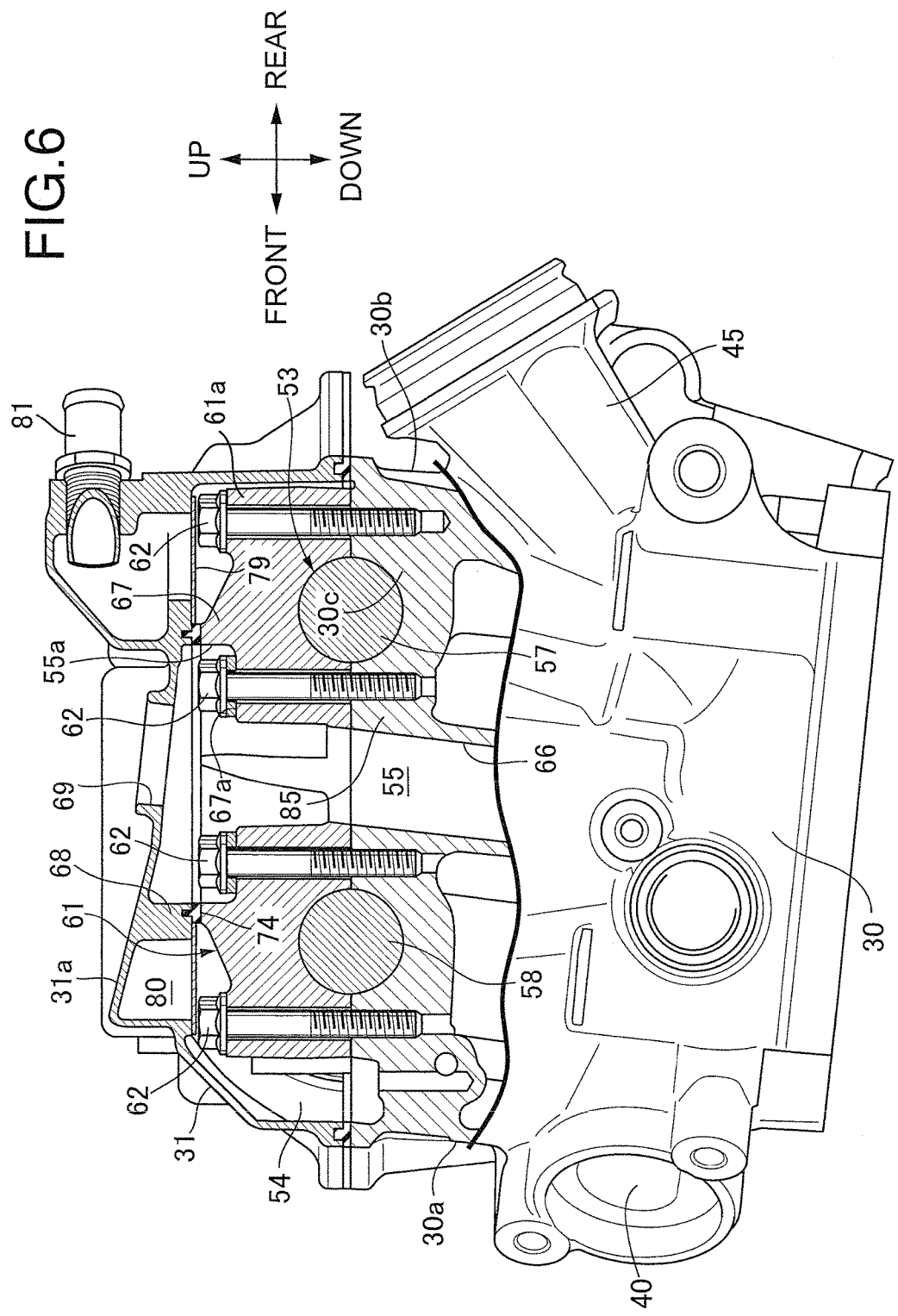
FIG. 6 is a sectional view taken along the line 6-6 of FIG. 4.
Figure 7:
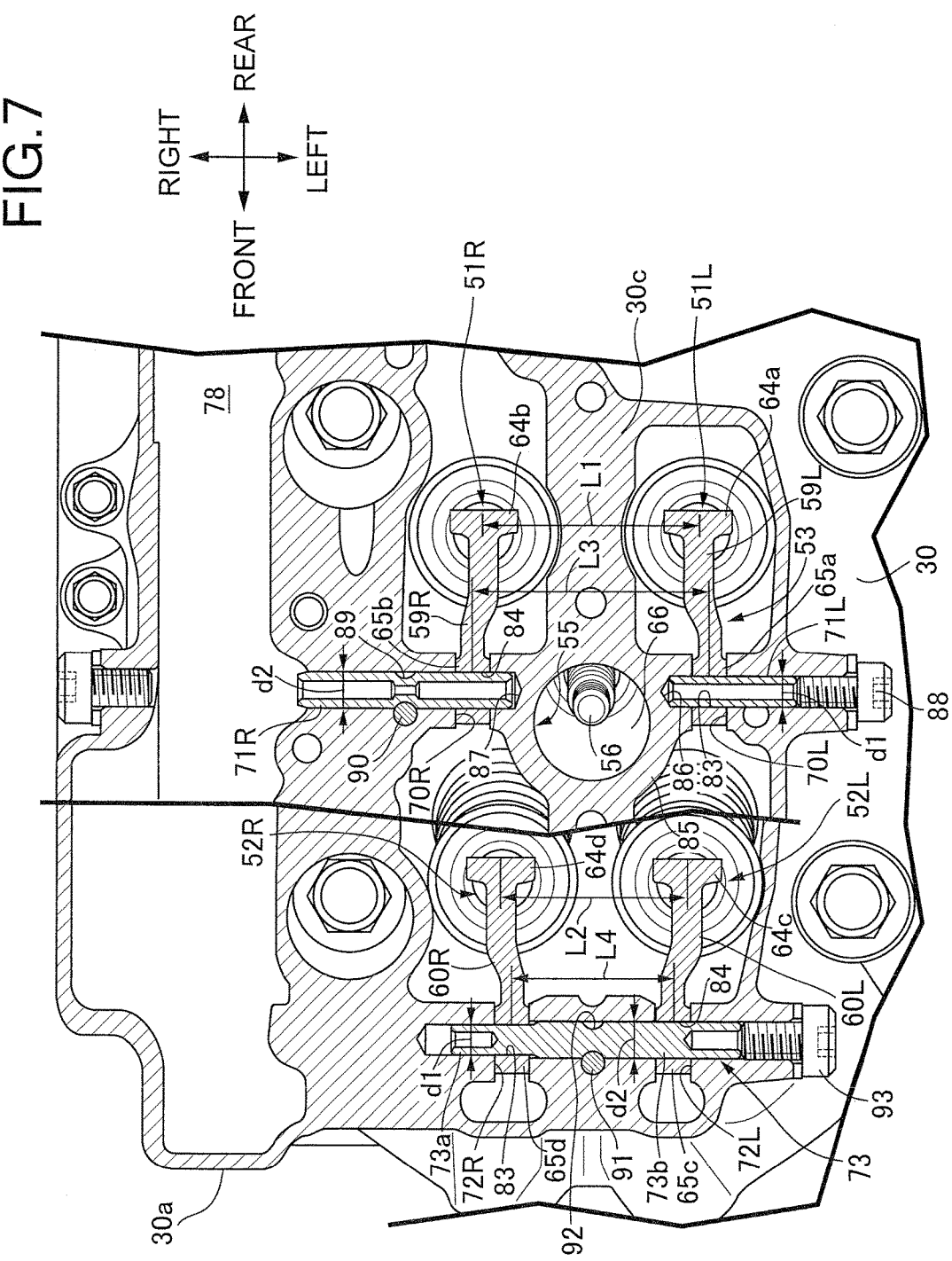
FIG. 7 a sectional view taken along the line 7-7 of FIG. 2.

With reference also to FIG. 5 to FIG. 7, a combustion chamber 39 is formed between the cylinder body 29 and the cylinder head 30, the top portion of a piston 38 facing the combustion chamber 39, the piston 38 being slidably fitted to the cylinder body 29, and a plug hole 55 is arranged so as to straddle between the cylinder head 30 and the head cover 31 that is attached to the cylinder head 30, an ignition plug 56 being to be inserted to the plug hole 55, the ignition plug 56 being attached to the cylinder head 30 so that the tip end of the ignition plug 56 faces the top portion of the combustion chamber 39.

In the cylinder head 30, a pair of intake valves 51L, 51R and a pair of exhaust valves 52L, 52R are disposed so as to be capable of opening/closing motion, the pair of intake valves 51L, 51R controlling the intake quantity that flows in from the intake port 44 to the combustion chamber 39, the pair of exhaust valves 52L, 52R controlling the exhaust quantity that is discharged from the combustion chamber 39 to the exhaust port 40, and a valve chamber 54 is formed between the cylinder head 30 and the head cover 31, the valve chamber 54 storing a valve train 53 that openably/closably drives the intake valves 51L, 51R and the exhaust valves 52L, 52R.

The valve train 53 includes an intake-side camshaft 57 and an exhaust-side camshaft 58, intake-side rocker arms 59L, 59R, and exhaust-side rocker arms 60L, 60R, the intake-side camshaft 57 and the exhaust-side camshaft 58 extending in parallel to each other in the vehicle width direction at positions that are apart from each other in the vehicle longitudinal direction and being disposed at positions that sandwich the plug hole 55 between the intake-side camshaft 57 and the exhaust-side camshaft 58, the paired intake-side rocker arms 59L, 59R being interposed between the intake-side camshaft 57 and the intake valves 51L, 51R so as to correspond to the intake valves 51L, 51R, the paired exhaust-side rocker arms 60L, 60R being interposed between the exhaust-side camshaft 58 and the exhaust valves 52L, 52R so as to correspond to the exhaust valves 52L, 52R.

The intake valves 51L, 51R are disposed behind the plug hole 55 in the vehicle longitudinal direction so as to be arrayed in the direction along the axis of the intake-side camshaft 57, namely, the vehicle width direction, the exhaust valves 52L, 52R are disposed forward of the plug hole 55 in the vehicle longitudinal direction so as to be arrayed in the direction along the axis of the exhaust-side camshaft 58, namely, the vehicle width direction, and the intake valves 51L, 51R and the exhaust valves 52L, 52R are disposed around the plug hole 55.

The intake-side camshaft 57 and the exhaust-side camshaft 58 are rotatably supported by a shaft support portion 30c and a cam holder 61, the shaft support portion 30c being integrally arranged in the cylinder head 30, the cam holder 61 being fastened to the shaft support portion 30c by a plurality of, for example, eight cam holder attaching bolts 62.

The cam holder 61 is formed so as to integrally include a left-side rotation support portion 61a, a right-side rotation support portion 61b, a rear connection portion 61c, and a front connection portion 61d, the left-side rotation support portion 61a extending in the vehicle longitudinal direction so as to rotatably support a portion on the left side in the vehicle width direction of the intake-side camshaft 57 and the exhaust-side camshaft 58 between the shaft support portion 30c and the left-side rotation support portion 61a, the right-side rotation support portion 61b extending in the vehicle longitudinal direction so as to rotatably support a portion on the right side in the vehicle width direction of the intake-side camshaft 57 and the exhaust-side camshaft 58 between the shaft support portion 30c and the right-side rotation support portion 61b and being disposed on the right side in the vehicle width direction of the left-side rotation support portion 61a, the rear connection portion 61c connecting between rear portions along the vehicle longitudinal direction of the left-side rotation support portion 61a and the right-side rotation support portion 61b, the rear connection portion 61c covering the intake-side camshaft 57, the front connection portion 61d connecting between front portions along the vehicle longitudinal direction of the left-side rotation support portion 61a and the right-side rotation support portion 61b, the front connection portion 61d covering the exhaust-side camshaft 58.

One intake valve 51L out of the pair of intake valves 51L, 51R is disposed on the left-side in the vehicle width direction of the left-side rotation support portion 61a and below the intake-side camshaft 57, and one exhaust valve 52L out of the pair of exhaust valves 52L, 52R is disposed on the left side in the vehicle width direction of the left-side rotation support portion 61a and below the exhaust-side camshaft 58. Also, the other intake valve 51R is disposed between the left-side rotation support portion 61a and the right-side rotation support portion 61b and below the intake-side camshaft 57, and the other exhaust valve 52R is disposed between the left-side rotation support portion 61a and the right-side rotation support portion 61b and below the exhaust-side camshaft 58.

The intake-side rocker arm 59L is formed so as to include a first valve connection portion 64a and a first support portion 65a at opposite ends, the first valve connection portion 64a being operatively connected with the intake valve 51L, the first support portion 65a being rockably supported by the shaft support portion 30c of the cylinder head 30, the intake-side rocker arm 59R is formed so as to include a second valve connection portion 64b and a second support portion 65b at opposite ends, the second valve connection portion 64b being operatively connected with the intake valve 51R, the second support portion 65b being rockably supported by the shaft support portion 30c, the exhaust-side rocker arm 60L is formed so as to include a third valve connection portion 64c and a third support portion 65c at opposite ends, the third valve connection portion 64c being operatively connected with the exhaust valve 52L, the third support portion 65c being rockably supported by the shaft support portion 30c and the exhaust-side rocker arm 60R is formed so as to include a fourth valve connection portion 64d and a fourth support portion 65d at opposite ends, the fourth valve connection portion 64d being operatively connected with the exhaust valve 52R, the fourth support portion 65d being rockably supported by the shaft support portion 30c.

The first to fourth valve connection portions 64a to 64d are formed so as to abut against the intake valves 51L, 51R and the exhaust valves 52L, 52R from the above, to push down the valves 51L, 51R; 52L, 52R downward, and to thereby open the valves. A pair of intake-side cams 57a that are arranged in the intake-side camshaft 57 slidably contacts with the intake-side rocker arms 59L, 59R from the above at positions close to the first and second valve connection portions 64a, 64b, and a pair of exhaust-side cams 58a that are arranged in the exhaust-side camshaft 58 slidably contacts with the exhaust-side rocker arms 60L, 60R from the above at positions close to the third and fourth valve connection portions 64c, 64d.

As clearly shown in FIG. 7, the first and second support portions 65a, 65b of one pair of the intake-side rocker arms 59L, 59R out of the pair of intake-side rocker arms 59L, 59R and the pair of exhaust-side rocker arms 60L, 60R are disposed around the plug hole 55 and between the intake valves 51L, 51R and the exhaust valves 52L, 52R in the direction orthogonal to the axes of the intake-side and exhaust-side camshafts 57, 58 (the vehicle longitudinal direction), and the third and fourth support portions 65c, 65d of the other pair of the exhaust-side rocker arms 60L, 60R out of the pair of intake-side rocker arms 59L, 59R and the pair of exhaust-side rocker arms 60L, 60R are disposed outside a region between the intake valves 51L, 51R and the exhaust valves 52L, 52R in the direction orthogonal to the axes of the intake-side and exhaust-side camshafts 57, 58 (the vehicle longitudinal direction).

Also, as clearly shown in FIG. 5, the first support portion 65a of one intake-side rocker arm 59L out of the one pair of the intake-side rocker arms 59L, 59R is disposed between a third imaginary plane PL3 and a fourth imaginary plane PL4, the third imaginary plane PL3 extending parallel to the axis of the intake-side camshaft 57 and including the operation axes of the intake valves 51L, 51R, the fourth imaginary plane PL4 extending parallel to the axis of the exhaust-side camshaft 58 and including the operation axes of the exhaust valves 52L, 52R, and similarly to the first support portion 65a, the second support portions 65b of the other intake-side rocker arm 59R out of the one pair of the intake-side rocker arms 59L, 59R is also disposed between the third and fourth imaginary planes PL3, PL4. Further, the third and fourth support portions 65c, 65d of the other pair of the exhaust-side rocker arms 60L, 60R are disposed outside the third and fourth imaginary planes PL3, PL4.

In other words, the first support portion 65a and the second support portion 65b are disposed in slits 70L, 70R that are formed in the shaft support portion 30c of the cylinder head 30 forward in the vehicle longitudinal direction of the intake-side camshaft 57, and are rockably supported respectively by the cylinder head 30 through first and second rocker shafts 71L, 71R that are attached to the shaft support portion 30c. Also, the third support portion 65c and the fourth support portion 65d are disposed in slits 72L, 72R that are formed in the shaft support portion 30c of the cylinder head 30 forward in the vehicle longitudinal direction of the exhaust-side camshaft 58, and are rockably supported by the cylinder head 30 through a single third rocker shaft 73 that is attached to the shaft support portion 30c.

A distance between the first and second valve connection portions 64a, 64b of the pair of intake-side rocker arms 59L, 59R is set shorter than a distance between the first and second support portions 65a, 65b, and as shown in FIG. 7, a distance L1 between the center portions in the width direction of the first and second valve connection portions 64a, 64b is shorter than a distance L3 between the center portions in the width direction of the first and second support portions 65a, 65b. Also, a distance between the third and fourth valve connection portions 64c, 64d of the pair of exhaust-side rocker arms 60L, 60R is set longer than a distance between the third and fourth support portions 65c, 65d, and as shown in FIG. 7, a distance L2 between the center portions in the width direction of the third and fourth valve connection portions 64c, 64d is set longer than a distance L4 between the center portions in the width direction of the third and fourth support portions 65c, 65d. In other words, the pair of intake-side rocker arms 59L, 59R are formed so as to be bent in the direction approaching to each other as it goes to the intake valves 51L, 51R side from the first and second support portions 65a, 65b, and the pair of exhaust-side rocker arms 60L, 60R are formed so as to be bent in the direction separating from each other as it goes to the exhaust valves 52L, 52R side from the third and fourth support portions 65c, 65d.

In the meantime, the intake-side rocker arm 59L and the exhaust-side rocker arm 60R have a same shape and are commonalized. As used herein, the term "commonalized" is intended to mean substantially identical to one another. The intake-side rocker arm 59L being disposed on one side (the left side in the vehicle direction in the present embodiment) in the direction along the axis of the intake-side camshaft 57 out of the pair of intake-side rocker arms 59L, 59R, the exhaust-side rocker arm 60R being disposed on the other side (the right side in the vehicle direction in the present embodiment) in the direction along the axis of the exhaust-side camshaft 58 out of the pair of exhaust-side rocker arms 60L, 60R, and the intake-side rocker arm 59R and the exhaust-side rocker arm 60L have a same shape and are commonalized, the intake-side rocker arm 59R being disposed on the other side (the right side in the vehicle direction in the present embodiment) in the direction along the axis of the intake-side camshaft 57 out of the pair of intake-side rocker arms 59L, 59R, the exhaust-side rocker arm 60L being disposed on the one side (the left side in the vehicle direction in the present embodiment) in the direction along the axis of the exhaust-side camshaft 58 out of the pair of exhaust-side rocker arms 60L, 60R.

In other words, the intake-side rocker arms 59L, 59R and the exhaust-side rocker arms 60L, 60R have two kinds of shapes, first support holes 83 having a same inside diameter are respectively formed in the first and fourth support portions 65a, 65d of one kind of the rocker arms, namely, the intake-side rocker arm 59L and the exhaust-side rocker arm 60R, second support holes 84 having a same inside diameter are respectively formed in the second and third support portions 65b, 65c of the other kind of the rocker arms, namely, the intake-side rocker arm 59R and the exhaust-side rocker arm 60L so that the inside dimeter becomes different from that of the first support hole 83, and the inside diameter of the first support hole 83 is set smaller than the inside diameter of the second support hole 84.

Therefore, an outside diameter d1 of the first rocker shaft 71L that is inserted to the first support hole 83 of the first support portion 65a is set smaller than an outside diameter d2 of the second rocker shaft 71R that is inserted to the second support hole 84 of the second support portion 65b (d1<d2). Also, the single third rocker shaft 73 that is common to the third and fourth support portions 65c, 65d is formed to have a step so that a portion of the third rocker shaft 73 which is inserted to the third support portion 65c and a portion of the third rocker shaft 73 which is inserted to the fourth support portion 65d are made different in the outside diameter, and the third rocker shaft 73 is formed so that a small diameter portion 73a and a large diameter portion 73b are connected to each other coaxially, the small diameter portion 73a having the outside diameter d1 same as that of the first rocker shaft 71L so as to be inserted to the first support hole 83 of the fourth support portion 65d, the large diameter portion 73b having the outside diameter d2 same as that of the second rocker shaft 71R so as to be inserted to the second support hole 84 of the third support portion 65c.

The plug hole 55 is configured with a plug bore 66, a cam holder side tubular portion 67, a head cover side tubular portion 68, and a through hole 69, the plug bore 66 being formed in the shaft support portion 30c of the cylinder head 30, the cam holder side tubular portion 67 being arranged integrally to the left-side rotation support portion 61a of the cam holder 61 so as to be connected to the plug bore 66, the head cover side tubular portion 68 being arranged integrally to the head cover 31 with a gasket 74 being interposed between the upper end of the cam holder side tubular portion 67, the through hole 69 being arranged in a ceiling wall 31a of the head cover 31 so as to be connected to the head cover side tubular portion 68.

In a part of the plug hole 55, a long hole portion 55a is formed, the long hole portion 55a being formed long in the direction orthogonal to the axes of the intake-side and exhaust-side camshafts 57, 58, the long hole portion 55a is formed by that the cam holder side tubular portion 67 and the head cover side tubular portion 68 are made have a section with an elliptical shape extending long in the direction orthogonal to the axes of the intake-side and exhaust-side camshafts 57, 58, and a step portion 67a that faces to the head cover 31 side is formed within the cam holder side tubular portion 67.

Within the long hole portion 55a, two cam holder attaching bolts 62 out of the eight cam holder attaching bolts 62 for fastening the cam holder 61 to the shaft support portion 30c of the cylinder head 30 are disposed so as to abut against and engage with the step portion 67a.

A breather plate 79 is fastened to the head cover 31, a breather chamber 80 is formed between the breather plate 79 and the head cover 31 so as to surround the long hole portion 55a of the plug hole 55, and a lead out pipe 81 is attached to the head cover 31 in order to lead out gas from the breather chamber 80 to the air cleaner 50 side in the intake device 46.

Figure 8:
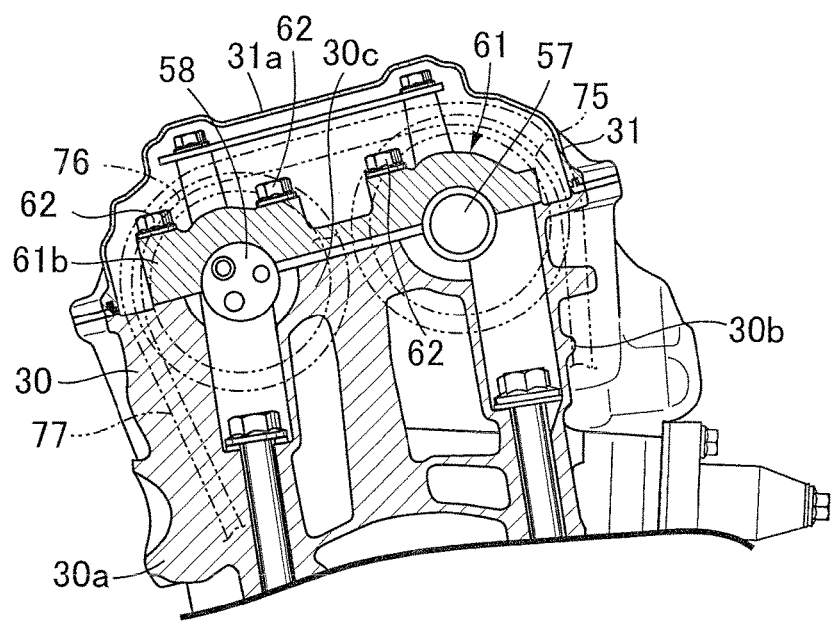
FIG. 8 is a longitudinal sectional side view of an engine body shown along the line 8-8 of FIG. 4.

With reference also to FIG. 8, follower sprockets 75, 76 are fixed to protruding end portions of the intake-side camshaft 57 and the exhaust-side camshaft 58 from the right-side rotation support portion 61b of the cam holder 61, and a cam chain 77 is wound around the follower sprockets 75, 76 in order to transfer the rotational power to the intake-side and exhaust-side camshafts 57, 58. Also, a cam chain chamber 78 for allowing the cam chain 77 to travel is formed in the crankcase 28, the cylinder body 29, and the cylinder head 30.

Watching FIG. 7, a tubular portion 85 for forming at least a part (a part in the present embodiment) of the plug hole 55 is arranged integrally in the shaft support portion 30c of the cylinder head 30, and the first and second rocker shafts 71L, 71R for supporting the first and second support portions 65a, 65b individually are disposed on opposite sides of the plug hole 55 in the direction along the axes of the intake-side and the exhaust-side camshafts 57, 58. Further, a pair of support recesses 86, 87 are formed in the tubular portion 85, end portions on the plug hole 55 side of the first and second rocker shafts 71L, 71R being fitted to the pair of support recesses 86, 87 respectively, and axial movement of at least one of the first and second rocker shafts 71L, 71R (the first rocker shaft 71L in the present embodiment) is prevented by the inner end closing portion of at least one of the pair of support recesses 86, 87 (the support recess 86 in the present embodiment) and an anti-come-off plug 88 that is attached to the cylinder head 30 so as to abut, from the side opposite to the plug hole 55, against the rocker shaft 71L which is at least one of the first and second rocker shafts 71L, 71R. The anti-come-off plug 88 is a bolt in the present embodiment, and the anti-come-off plug 88 that is a bolt may be formed so as to be integral with the first rocker shaft 71.

In the meantime, a part of the cam chain chamber 78 is formed in the cylinder head 30, the part of the cam chain chamber 78 being disposed so that the other rocker shaft of the first and second rocker shafts 71L, 71R, namely, the second rocker shaft 71R is sandwiched between the cam chain chamber 78 and the plug hole 55, and a first anti-come-off pin 90 penetrates the cam holder 61, is press-fitted into the cylinder head 30 so as to prevent axial movement of the second rocker shaft 72R, and is thereby attached to the cylinder head 30, the first anti-come-off pin 90 engaging with a first annular locking groove 89 that is formed on the outer surface of the intermediate portion of the second rocker shaft 71R.

A second annular locking groove 92 is formed in the large diameter portion 73b of the third rocker shaft 73, a second anti-come-off pin 91 penetrates the cam holder 61 and is press-fitted into the cylinder head 30, the second anti-come-off pin 91 engaging with the second annular locking groove 92 and preventing axial movement of the third rocker shaft 73, and a cap 93 is screwed into the left side wall of the cylinder head 30, the cap 93 abutting against the end portion of the third rocker shaft 73 on the side opposite to the cam chain chamber 78. The cap 93 is a bolt in the present embodiment, the cap 93 that is a bolt may be formed so as to be integral with the third rocker shaft 73, and in this case, the second annular locking groove 92 and the second anti-come-off pin 91 become unnecessary.

Next, the operation of the present embodiment will be explained. Two pairs of the rocker arms, namely, the pair of intake-side rocker arms 59L, 59R and the pair of exhaust-side rocker arms 60L, 60R are respectively interposed between the intake-side camshaft 57 and the exhaust-side camshaft 58 and the intake valves 51L, 51R and the exhaust valves 52L, 52R, the intake-side camshaft 57 and the exhaust-side camshaft 58 being disposed in parallel to each other with the plug hole 55 interposed therebetween, the intake valves 51L, 51R and the exhaust valves 52L, 52R being disposed around the plug hole 55 and are arrayed by pairs in the axial direction of the intake-side and exhaust-side camshafts 57, 58. The first and second support portions 65a, 65b of one pair of the intake-side rocker arms 59L, 59R are disposed around the plug hole 55 and between the intake valves 51L, 51R and the exhaust valves 52L, 52R in the direction orthogonal to the axes of the intake-side and exhaust-side camshafts 57, 58. The third and fourth support portions 65c, 65d of the other pair of the exhaust-side rocker arms 60L, 60R are disposed outside a region between the intake valves 51L, 51R and the exhaust valves 52L, 52R in the direction orthogonal to the axes of the intake-side and exhaust-side camshafts 57, 58. By such disposal of the intake-side rocker arms 59L, 59R and the exhaust-side rocker arms 60L, 60R, the intake valves 51L, 51R can be disposed closer to each other and the exhaust valves 52L, 52R can be disposed closer to each other, in the direction along the axes of the intake-side and exhaust-side camshafts 57, 58, while securing the length of respective rocker arms 59L, 59R; 60L, 60R to reduce the rocking angle while avoiding interference with the plug hole 55, and downsizing of the cylinder head 30 can be achieved.

Also, the distance between the first and second valve connection portions 64a, 64b of the intake-side rocker arms 59L, 59R is set shorter than the distance between the first and second support portions 65a, 65b, the distance between the third and fourth valve connection portions 64c, 64d of the exhaust-side rocker arms 60L, 60R is set longer than the distance between the third and fourth support portions 65c, 65d, and therefore the intake valves 51L, 51R can be disposed closer to each other and the exhaust valves 52L, 52R can be disposed closer to each other, in the direction along the axes of the intake-side and exhaust-side camshafts 57, 58. Further, the distance between the third and fourth support portions 65c, 65d that are disposed outside a region between the intake valves 51L, 51R and the exhaust valves 52L, 52R in the direction orthogonal to the axes of the intake-side and exhaust-side camshafts 57, 58 can be made comparatively short. As a result, it can contribute to further downsizing of the cylinder head 30.

Also, the intake-side rocker arm 59L, on one side along the axes of the intake-side and exhaust-side camshafts 57, 58 out of the intake-side rocker arms 59L, 59R, and the exhaust-side rocker arm 60R, on the other side along the axes of the intake-side and exhaust-side camshafts 57, 58 out of the exhaust-side rocker arms 60L, 60R, have a same shape and are commonalized. Moreover, the intake-side rocker arm 59R, on the other side along the axes of the intake-side and exhaust-side camshafts 57, 58 out of the intake-side rocker arms 59L, 59R, and the exhaust-side rocker arm 60L, on one side along the axes of the intake-side and exhaust-side camshafts 57, 58 out of the exhaust-side rocker arms 60L, 60R, have a same shape and are commonalized. As a result, the pair of intake-side rocker arms 59L, 59R on the intake valves 51L, 52R side and the pair of exhaust-side rocker arms 60L, 60R on the exhaust valves 52L, 52R side commonalize the bending direction of these rocker arms 59L, 59R; 60L, 60R between on the intake side and on the exhaust side and can be thereby consolidated into two kinds of shapes, the number of components can be reduced, and assembling efficiency can be improved.

Also, the inside diameter of the first support hole 83 and the inside diameter of the second support hole 84 are set different from each other, the first support hole 83 being formed in the first and fourth support portions 65a, 65d of one kind of the intake-side rocker arm 59L and the exhaust-side rocker arm 60R out of two pairs of the rocker arms 59L, 59R; 60L, 60R each pair having two kinds of shapes, the second support hole 84 being formed in the second and third support portions 65b, 65c of the other kind of the intake-side rocker arm 59R and the exhaust-side rocker arm 60L.

Therefore, while achieving downsizing of the cylinder head 30, assembling position of each of the rocker arms 59L, 59R; 60L, 60R can be made clear, misassembling can be prevented, and assembling efficiency can be improved.

Also, the tubular portion 85 forming at least a part of the plug hole 55 is arranged integrally in the cylinder head 30, the first and second rocker shafts 71L, 71R supporting the first and second support portions 65a, 65b individually are disposed on opposite sides of the plug hole 55 in the direction along the axes of the intake-side and exhaust-side camshafts 57, 58. The pair of support recesses 86, 87 are formed in the tubular portion 85, end portions on the plug hole 55 side of the first and second rocker shafts 71L, 71R being fitted to the pair of support recesses 86, 87 respectively, and axial movement of the first rocker shaft 71L that is at least one of the first and second rocker shafts 71L, 71R is prevented by the anti-come-off plug 88 and the inner end closing portion of the support recess 86 which is at least one of the pair of support recesses 86, 87, the anti-come-off plug 88 being attached to the cylinder head 30 so as to abut against at least the rocker shaft 71L from the side opposite to the plug hole 55. Therefore, axial movement of the first rocker shaft 71L can be prevented utilizing the tubular portion 85, and assembling efficiency of the first rocker shaft 71L and productivity of the internal combustion engine E can be thereby improved.

Also, a part of the cam chain chamber 78 is formed in the cylinder head 30, the cam chain chamber 78 being disposed so that the second rocker shaft 71R that is the other of the first and second rocker shafts 71L, 71R is sandwiched between the cam chain chamber 78 and the plug hole 55, and the first anti-come-off pin 90 is attached to the cylinder head 30, the first anti-come-off pin 90 engaging with the first annular locking groove 89 that is formed on the outer surface of the intermediate portion of the second rocker shaft 71R. Therefore, it is not required to reserve a special space between the plug hole 55 and the cam chain chamber 78, and downsizing of the cylinder head 30 can be thereby achieved, the special space being for preventing coming-off of the second rocker shaft 71R.

Also, the single third rocker shaft 73 which is common to the third and fourth support portions 65c, 65d is formed to have a step so that a portion of the third rocker shaft 73 which is inserted to the third support portion 65c and a portion of the third rocker shaft 73 which is inserted to the fourth support portion 65d are made different in the outside diameter. Therefore, such event can be coped with that the inside diameters of the first and second support holes 83, 84 formed in the third and fourth support portions 65c, 65d are different from each other, a space required for supporting the third and fourth support portions 65c, 65d is reduced, the coming-off structure for the third rocker shaft 73 is simplified, and assembling efficiency is improved which can contribute to improvement of the productivity.

Although the embodiment of the present invention has been explained above, the present invention is not limited to the embodiment described above, and various design changes can be effected without departing from the gist of the present invention.

For example, although explanation was made with respect to the single-cylinder DOHC-type internal combustion engine E in the embodiment described above, it is also possible to apply the present invention to each cylinder of a multi-cylinder DOHC-type internal combustion engine.

What is claimed is:

1. A DOHC-type internal combustion engine, comprising:
an engine body comprising a cylinder head in which an intake-side camshaft and an exhaust-side camshaft are disposed in parallel to each other with a plug hole interposed therebetween,
an ignition plug to be inserted into the plug hole,
a pair of intake valves and a pair of exhaust valves disposed around the plug hole, said intake valves being arrayed in a direction along an axis of the intake-side camshaft, said exhaust valves being arrayed in a direction along an axis of the exhaust-side camshaft,
two pairs of rocker arms respectively interposed between the intake-side and exhaust-side camshafts and said intake valves and said exhaust valves, the two pairs of rocker arms respectively corresponding to said intake valves and said exhaust valves while respectively including support portions and valve connection portions, the support portions being rockably supported by the cylinder head, the valve connection portions being operatively connected respectively with said intake valves and said exhaust valves,
wherein first and second support portions of a first pair of the two pairs of rocker arms out of the support portions are disposed between the pair of intake valves and the pair of exhaust valves in a direction orthogonal to the axes of the intake-side and exhaust-side camshafts and around the plug hole, and
third and fourth support portions of a second pair of the two pairs of rocker arms out of the support portions are disposed outside a region between the pair of intake valves and the pair of exhaust valves in the direction orthogonal to the axes of the intake-side and exhaust-side camshafts,
wherein a distance between first and second valve connection portions of the first pair of the two pairs of rocker arms is set shorter than a distance between the first and second support portions, and wherein a distance between third and fourth valve connection portions of the second pair of the two pairs of rocker arms is set longer than a distance between the third and fourth support portions.

2. The DOHC-type internal combustion engine according to claim 1, wherein a first rocker arm, on one side along the axes of the intake-side and exhaust-side camshafts out of the first pair of the rocker arms, and a second rocker arm, on the other side along the axes of the intake-side and exhaust-side camshafts out of the second pair of the rocker arms, have a same shape and are substantially identical to one another.

3. The DOHC-type internal combustion engine according to claim 2, wherein the two pairs of the rocker arms are formed to include two shapes, such that an inside diameter of a support hole, which is formed in the first and fourth support portions of one subset of said rocker arms having a first shape of the two shapes, and an inside diameter of a support hole, which is formed in the second and third support portions of another subset of said rocker arms having a second shape of the two shapes, are different from each other.

4. The DOHC-type internal combustion engine according to claim 3, wherein:
a tubular portion is arranged integrally in the cylinder head, the tubular portion forming at least a part of the plug hole,
first and second rocker shafts are disposed on opposite sides of the plug hole in a direction along the axes of the intake-side and exhaust-side camshafts, the first and second rocker shafts supporting the first and second support portions individually, a pair of support recesses are formed in the tubular portion, end portions on the plug hole side of the first and second rocker shafts being fitted to the pair of support recesses respectively, and axial movement of at least one of the first and second rocker shafts is prevented by an anti-come-off plug and an inner end closing portion of at least one of the pair of support recesses, the anti-come-off plug being attached to the cylinder head so as to abut, from a side opposite to the plug hole, against at least the one of the first and second rocker shafts.

5. The DOHC-type internal combustion engine according to claim 4, wherein:

a part of a cam chain chamber is formed in the cylinder head, the cam chain chamber being disposed so that another of the first and second rocker shafts is sandwiched between the cam chain chamber and the plug hole, and an anti-come-off pin is attached to the cylinder head, the anti-come-off pin engaging with an annular locking groove that is formed on an outer surface of an intermediate portion of the other rocker shaft.

6. The DOHC-type internal combustion engine according to claim 3, wherein a single third rocker shaft is formed to have a step so that a portion of the third rocker shaft which is inserted to the third support portion and a portion of the third rocker shaft which is inserted to the fourth support portion are made different in an outside diameter, the third rocker shaft being common to the third and fourth support portions.

* * * * *